United States Patent [19]

Van Der Bend et al.

[11] 3,857,795

[45] Dec. 31, 1974

[54] PREPARATION OF TiCl$_3$ COMPONENT OF OLEFIN POLYMERIZATION CATALYST

[75] Inventors: Herman Th. Van Der Bend; Willem Sjardijn, both of Amsterdam, Netherlands

[73] Assignee: Shell Oil Company, New York, N.Y.

[22] Filed: Dec. 18, 1972

[21] Appl. No.: 316,191

[30] Foreign Application Priority Data
Dec. 20, 1971 Great Britain.................. 59013/71

[52] U.S. Cl......... 252/429 A, 252/429 C, 260/88.2, 260/93.7, 260/94.9 B, 260/94.9 E, 260/878
[51] Int. Cl............................................. B01j 11/84
[58] Field of Search.................... 252/429 A, 429 C

[56] References Cited
UNITED STATES PATENTS

| | | | |
|---|---|---|---|
| 2,971,925 | 2/1961 | Vandenberg.................. | 252/429 C |
| 3,261,821 | 7/1966 | Vanderberg................. | 252/429 C X |
| 3,562,239 | 2/1971 | deJong........................ | 252/429 A X |

*Primary Examiner*—Patrick P. Garvin

[57] ABSTRACT

Titanium trichloride-containing compositions for use as catalyst component in stereoregular olefin polymerization are prepared by gradual addition of a solution of titanium tetrachloride to a solution of trialkyl aluminum in certain low-boiling inert diluents. The mixture is prepared and held at a temperature below about −90° C until addition is complete, is thereafter gradually warmed up at least to ambient temperature but not above 80° C and held until reduction of TiCl$_4$ to TiCl$_3$ is complete, and is then heated to an elevated temperature at which the TiCl$_3$ is converted to the violet form. Refinements of this procedure include control of mixing and heating rates and post-treatment of the reaction product to produce catalyst components having various desired properties.

According to one mode of the invention, titanium trichloride-containing compositions can be obtained in particles which are larger and/or more clear and glassy and/or have a smoother surface than can be obtained when the mixing of titanium tetrachloride with aluminum trialkyl is carried out at conditions outside those specified. Used with dialkyl aluminum chloride in the polymerization of propylene, such compositions can produce excellent stereoregular polypropylene in the form of polymer particles of high bulk density which are substantially free of fines and hence non-dusting and exhibiting good powder flow.

According to a second mode, titanium trichloride-containing compositions can be obtained in particles which, while still relatively dense, have a porous surface. Used with dialkyl aluminum chloride, these compositions are especially suitable for use in staged propylene polymerization followed by ethylene-propylene copolymerization to produce impact-improved polypropylene compositions.

4 Claims, No Drawings

PREPARATION OF TiCl₃ COMPONENT OF OLEFIN POLYMERIZATION CATALYST

BACKGROUND OF THE INVENTION

1. Field of the Invention

This invention relates to an improvement in the preparation of titanium trichloride-containing stereoregulating olefin polymerization catalysts.

2. Description of the Prior Art

It is well known to polymerize olefins to linear polymers and specifically to polymerize propylene and certain other alpha-monoolefins to stereoregular polyolefins by contact with so-called Ziegler or Ziegler-Natta catalysts. The preferred catalysts of this type consist of the reaction products of titanium trichloride or titanium trichloride-containing compositions and organometallic compounds of which aluminum alkyl halides and aluminum trialkyls are preferred.

The chemical reactions and physical transformations involved in the production of effective catalysts of the above-described types for stereoregular olefin polymerization are complex and to some extent still obscure and controversial. Some little-understood effects are involved in the relationship between catalyst preparation methods and the physical and chemical characteristics of polymer produced by contact with the catalyst.

It is known, for example, to produce the titanium trichloride component of such catalysts by reacting titanium tetrachloride in solution with an aluminum trialkyl compound as reducing agent, and to convert such a reaction product to one in which the titanium is present in its violet form by heating the mixture in which the titanium tetrachloride has been reduced. Such catalyst preparations are described, for example, in U.S. Pat. No. 2,971,925 to Winkler et al. and U.S. Pat. No. 3,261,821 to Vandenberg.

Catalysts prepared according to these methods of the prior art tend to produce polymer of excellent physical properties, but generally as a powdery fluff of low bulk density. If polymer of identical molecular structure were produced in the form of particles having a substantially higher bulk density, substantial economies could be effected in the manufacture and utilization of the polymers. Further improvement of the activity of such catalysts is also generally possible and may be desirable for some commercial uses.

In U.S. Pat. No. 3,562,239, an improved catalyst preparation process is disclosed which comprises reducing titanium tetrachloride with a trialkylaluminum be gradually adding titanium tetrachloride to the trialkylaluminum at a temperature below 30° C and subsequently raising the temperature in a controlled manner to above 80° C.

The important aspects of the invention disclosed in said U.S. Pat. No. 3,562,239 are the use of the combined features of adding the titanium tetrachloride to the aluminum trialkyl, rather than adding the aluminum alkyl to the titanium tetrachloride as was conventionally done, and carrying out this addition at a very low temperature, whereby production of TiCl₃-containing catalysts components of relatively high density is achieved. When used with aluminum dialkyl halide co-catalyst, the thus-prepared TiCl₃ compositions provide highly active, stereospecific catalysts which, when used in the polymerization of propylene, yield polymer powder having a high compactness or bulk density. The experimental work disclosed in said patent consists primarily of preparations carried out at mixing temperatures down to −70° C in 2,2,4-trimethylpentane (isooctane) as diluent. Operability of the process is, of course, not limited to those particular conditions; use of temperatures down to −90° C and use of pentane, hexane, heptane or toluene as solvents is specifically disclosed in the patent.

In continuing studies of catalyst preparations according to said invention, it was found that polypropylene powders obtained when using a TiCl₃ composition prepared in isooctane diluent at initial mixing temperatures in the range of −70° C usually show a high content of very fine particles having a diameter of less than 53 microns ($\mu$) and a low content of relatively large particles having a diameter above 88 microns. Polypropylene powders obtained with such catalysts, which have a relatively large content of very small particles, exhibit a strong tendency toward dusting and flow very badly or do not flow at all at conditions at which powder flow is conventionally determined (ASTM Method D 1895 Method A).

A related process using TiCl₃-containing catalysts comprises the preparation of ethylene-modified polypropylene compositions having high impact resistance (also called "toughened" polypropylene) by an initial homopolymerization of propylene followed by a copolymerization which is brought about by contacting the homopolymerization reaction mixture which contains "living" catalyst with a mixture of propylene and ethylene. Such products, when produced with representative catalysts of the prior art, have a somewhat higher content of hydrocarbon-soluble components than homopolymer produced with identical catalysts. Separation of such polymer particles from the reaction diluent can result in precipitation of originally dissolved polymer components during the separation step. This causes the polymer powder particles to adhere to each other and creates consequent processing difficulties.

SUMMARY OF THE INVENTION

It has now been found that substantial improvements can be made in the process for the preparation of the TiCl₃-containing component of olefin polymerization catalysts in which TiCl₄ is added to aluminum trialkyl at temperatures below −30° C. It was unexpectedly found that a TiCl₃ component prepared by adding TiCl₄ to aluminum trialkyl at temperatures below −90° C in certain diluents of low molecular weight, as further described in this specification, when used with dialkyl aluminum halide in propylene polymerization, results not only in production of polymer of high bulk density but can produce polypropylene powder having a particle size distribution which is free or substantially free (containing at most about 2%) of particles of less than 53 microns diameter. Such polypropylene exhibits considerably decreased powder dusting and improved powder flow compared to powder having a substantial content of fines below 53 microns. It has been further found that several factors other than initial mixing temperature and diluent selection have an important effect in determining the physical character of the TiCl₃-containing catalyst particles, which in turn has an important effect on the characteristics of the polypropylene particles produced with such catalysts. The principal one of these other factors is the rate of addition of titanium tetrachloride to aluminum trialkyl. Another important factor is the rate at which the catalyst preparation mixture warms up from the original low temperature; the degree of stirring thereof, as evidenced by energy input, may also be significant.

As further detailed hereinbelow, control of these variables permits the production either of dense TiCl$_3$-containing catalyst component particles which have a smooth glassy surface, which are particularly adapted for the production of propylene homopolymer of high bulk density and excellent powder and flow characteristics, or of TiCl$_3$-containing catalysts component particles which, while still relatively dense, exhibit porosity of the catalyst particle surface and are particularly adapted for use in the production of ethylene-modified polypropylene, such as is produced when a propylene homopolymerization step is followed, in the presence of live catalyst, by a propylene-ethylene copolymerization step.

Catalysts prepared according to the present invention have the further advantage of relatively very high catalyst activity. The activity is substantially higher, in most cases, than that obtained with many other catalysts prepared from TiCl$_3$-containing components and aluminum alkyls as described in the prior art, particularly catalysts prepared from TiCl$_3$ components prepared by reduction of TiCl$_4$ with hydrogen or with aluminum metal and activated by ball milling, which are of the type employed in many commercial propylene polymerization processes.

According to the present invention, olefin polymerization catalyst component compositions containing titanium trichloride are prepared by reduction of titanium tetrachloride with a trialkylaluminum at low temperature as follows:

Titanium tetrachloride is gradually added to a trialkylaluminum at a temperature T below −90° C, e.g., within the range of about −95° to −150° C, preferably the range of about −95° to −125° C, and most preferably the range of about −95° C to about −110° C or −98° to −110° C; the reduction is carried out in the presence of a liquid alkane having an atmospheric freezing point at least below T −5° C, much preferably below T −10° C, and most preferably below T −15° C. It is thought that particularly suitable diluents are alkanes having at least two hydrogen atoms attached to the same or different carbon atoms adjoining the terminal carbon atoms of the longest carbon chain. It is preferred for the liquid alkane diluent to have an atmospheric boiling point above ambient temperature. Upon completion of the additions, the temperature is raised in controlled fasion, detailed below.

DESCRIPTION OF THE PREFERRED EMBODIMENTS

A simplified representation of the overall reactions which are believed to take place during preparation of titanium trichloride-catalyst component according to this invention is as follows:

The reduction of titanium tetrachloride with a trialkyl aluminum at very low temperatures proceeds according to the equation:

$$TiCl_4 + AlR_3 \rightarrow TiCl_3 + AlR_2Cl + R$$

(1)

in which R = alkyl. When the temperature is then raised to intermediate temperatures, remaining TiCl$_4$ preferentially reacts as follows with the dialkyl aluminum chloride produced according to equation (1):

$$TiCl_4 + AlR_2Cl \rightarrow TiCl_3 + AlRCl_2 + R$$

(2)

Further raising of the temperature can finally effect the reaction of any remaining TiCl$_4$ with the alkyl aluminum dichloride produced according to equation (2):

$$TiCl_4 + AlRCl_2 \rightarrow TiCl_3 + AlCl_3$$

(3)

There is an equilibrium relationship between all these reactions. Within practical time limits, reactions (2) and (3) do not proceed to a significant extent at temperatures below about −50° C and reaction (3) does not proceed to a significant extent at temperatures below about 0° C when the reactants are present within the ranges given below.

Upon heating to temperatures above 80° C, titanium trichloride is converted into a violet (gamma) modification. Suitable temperatures for this are principally between 100° C and 250° C and preferably between 120° C and 175° C.

In the reaction scheme taken as a whole, TiCl$_4$ and trialkylaluminum are necessary in the molar ratio of about 3:1 (or in an Al:Ti ratio of about 0.33). Suitable molar ratios for the purpose of the invention lie between 3:0.9 and 3:1.5 (or Al:Ti ratios between 0.30 and 0.5) and preferred ratios between 3:1.05 and 3:1.3 (or Al:Ti ratios between 0.35 and 0.43). For the preparation of TiCl$_3$ compositions characterized by surface porosity, the preferred range of Ti:Al ratios is from 3:1 to 3:1.4 (or Al:Ti ratios between 0.33 and 0.38).

Suitable initial concentrations of the trialkylaluminum lie between 0.1 and 3 and preferably between 0.5 and 1 mol per liter. It is preferred to add the titanium tetrachloride dissolved in diluent, preferably in a concentration of between 1 and 3 mol per liter. The diluted titanium tetrachloride can, if desired, be cooled before the addition, but preferably not below about −65° C (in order to prevent precipitation of solid TiCl$_4$). fashion, The amount of TiCl$_4$ added at temperatures below −90° C can be limited to approximately 1 mol per mol of trialkylaluminum and the ramainder of the TiCl$_4$ required can be added later, provided the temperature is still below −30° C. It is, however, equally possible to incorporate a larger amount of TiCl$_4$ or even the total required amount of TiCl$_4$ into the mixture in the first stage, i.e., below about −90° C.

At least the initial mixing of reactants in the preparation of TiCl$_3$-component is carried out in a liquid alkane diluent having an atmospheric freezing point at least 5° C, preferably at least 10° C and most preferably at least 15° C below the lowest temperature at which the addition of TiCl$_4$ solution to aluminum trialkyl solution is to be conducted. The selection of the diluent is therefore conditioned on the selected mixing temperature. The diluent should be free of non-hydrocarbon impurities such as unsaturated compounds or polar organic compounds. It may be a mixture of alkanes. The alkane diluent may, for example, contain ethane, propane, n-butane, isobutane, n-pentane, isopentane, methylpentanes, dimethylbutanes, and higher branched alkanes, provided the diluent has the desired freezing point. It is preferred not to employ diluents having more than about seven carbon atoms per molecule. Pure isooctane has been found unsuitable for catalyst preparations according to this invention. n-Pentane and isopentane are especially preferred as diluents. n-Butane is also a very good diluent.

Since a step in the preparation of the $TiCl_3$ component according to this invention involves heating the reaction mixture after completion of the reduction reaction, it may be necessary to exchange a low boiling diluent, e.g., n-butane, employed in the original reduction reaction, for a higher boiling alkane component, e.g., isopentane or isooctane, in which the precipitated $TiCl_3$ component is then heated. The process of this invention, may, therefore, include the process in which the original mixing below about $-90°$ C and reaction below about $-30°$ C are carried out in a low boiling and low freezing diluent having the above stated characteristics, followed by separation of the precipitated $TiCl_3$ from the diluent prior to the heating step by decanting or filtration and reslurrying in a different alkane diluent which need not have the specified low freezing point.

The rate at which titanium tetrachloride is added to the aluminum trialkyl affects the properties of the resulting titanium trichloride. A limitation on the rate at which the addition can be carried out is the rate at which heat of reaction can be removed.

When it is desired to produce a $TiCl_3$-containing catalyst component having the densest possible particles and having a relatively smooth glassy surface, it is important to carry out the addition of $TiCl_4$ gradually over an extended period of time. This should be at least 1 hour. It is especially important to add the first 10% of $TiCl_4$ gradually over a period of more than 15 minutes, e.g., 25 minutes or more, at a relatively uniform rate. While the $TiCl_4$ may be added as a continuous stream, it is preferred to add it dropwise or in very small increments as by spraying or sprinkling.

When it is desired to produce $TiCl_3$-containing catalysts components which possess surface porosity, it is important to add the first, relatively small, increment of $TiCl_4$ rapidly to the aluminum trialkyl solution. In order to obtain the desired surface porosity, the first 5 to 10 percent of $TiCl_4$ is added in a very short period, which may be as little as one minute and, in any event, in less than 15 minutes and preferably less than 5 minutes.

A second factor which appears to be important in controlling the surface characteristics of the $TiCl_3$-containing catalyst components is the rate at which the temperature of the initial reaction mixture is raised. Relatively slow warming of the mixture from the initial mixing temperature below $-90°$ C, at rates of less than $1°$ C/minute, tends to produce dense, smooth surface type of $TiCl_3$-containing component particles while relatively rapid warming at rates faster than $1°$ C/minute, particularly $2°-5°$ C/minute, is beneficial for the production of $TiCl_3$-containing catalyst component particles having porous surfaces.

Warming of the reaction mixture from the initial mixing temperature below $-90°$ C is carried out over a period of time, preferably at the above-stated rates.

Upon completion of the reduction, the temperature of the reaction mixture is preferably raised to above 80°C to convert at least a substantial part of the titanium trichloride into a violet (gamma) modification; temperatures between $80°$ and $300°$ C may be employed, temperatures between $100°$ and $250°$ C being particularly suitable and between $120°$ and $175°$ C being especially preferred.

Typical preparations may be carried out by warming from the initial mixing temperature to ambient temperature, i.e., to about $+15°$ to about $+20°$ C over a period from 1 to 3 hours, holding 30 minutes to 2 hours at about $15°-20°$ C to assure substantial completion of $TiCl_4$ reduction, and heating to and holding at about $160°$ C during a period of from 30 minutes to 2 hours. Once the desired reactions have been completed, it is preferred to cool rapidly to below $80°$ C.

Vigorous stirring of the reaction mixture is likewise desirable. Generally, the specific stirring power determined after completion of $TiCl_4$ addition should be kept within the range of 50 to 2,000 Watt/m$^3$, values within the range of 80 to 800 Watt/m$^3$ being preferred. The stirring power is determined via measurement of the torque of the driving motor and the speed of the impeller as described by J. H. Rushton, E. W. Costich and H. J. Everett in Chemical Engineering Progress 46 (1950) pages 395–404 and 467–477. Specific stirring power is the stirring power in Watt/m$^3$ of reactor charge.

The $TiCl_3$-containing catalyst components of this invention are of particular advantage in the homopolymerization of propylene and in the sequential polymerization of propylene and ethylene-propylene mixtures, for the reasons disclosed herein. Similar special advantages may also be obtained in production of butene-l homopolymer and of butene-l/butene-l-ethylene impact improved copolymer. However, the same $TiCl_3$-containing compositions may also be used, if desired, as the transition metal component in the catalytic polymerization of other alpha monoolefins or diolefins which are known to be polymerizable to polyolefins by means of Ziegler type or Ziegler-Natta type catalysts. Such monomers comprise ethylene, pentene-l, styrene and butadiene and other conjugated or unconjugated dienes.

The catalysts prepared according to this invention tend to have very high initial activity for propylene polymerization. When used as produced, there is a tendency for the compact $TiCl_3$-component particles to disintegrate and for the disintegration products to produce polymer particles of undesirably small particle diameter. This tendency can be overcome by bringing the $TiCl_3$-containing composition of this invention, prior to its use in the main polymerization step, into contact in a "prepolymerization" step with sufficient ethylenically unsaturated hydrocarbon, suitably propylene, in a liquid inert diluent at especially mild polymerization conditions at a temperature below $62°$ C, preferably between $10°$ and $55°$ C, and preferably at a propylene pressure not above about 2 bars (gauge) to form at least 0.1 g, and preferably 1 to 50 g, of polymer per gram of $TiCl_3$. Suitably, only part of the dialkyl aluminum monohalide to be used for the activation of the $TiCl_3$ for polymerization is added in this prepolymerization stage. It is preferred that during such prepolymerization the $TiCl_3$ concentration in the diluent be between 0.1 and 2 mol/l and the Ti/Al molar ratio between 0.5:1 and 2:1.

For use in olefin polymerization, the titanium trichloride containing composition is activated by reaction with an aluminum alkyl compound, preferably a dialkyl aluminum monohalide, most preferably diethylaluminum chloride (DEAC). Suitable molar ratios of dialkylaluminum monohalides to titanium trichloride are between 0.5:1 and 10:1, for example between 2:1 and 5:1. Fresh amounts of dialkylaluminum halide can, if desired, be added during the polymerization. Catalyst components are continuously or intermittently added in continuous polymerization processes.

The alkyl groups in the aluminum alkyl compounds which are used according to the invention for reducing $TiCl_4$ or for activating $TiCl_3$-containing catalyst component may be branched or unbranched. As a rule they will not contain more than 12 carbon atoms. Ethyl groups are preferred. The halogen in the activating dialkylaluminum halides is preferably chlorine.

The polymerization by means of the titanium trichloride obtained according to the invention can be carried out in analogy with all known and conventional processes in which $TiCl_3$ is used as a catalyst. The terms "polymerization," "polymerizing" and "polymer" as used in this specification, when appropriate as indicated by the context, include "copolymerization," "copolymerizing" and "copolymer."

The polymerization normally takes place in an inert liquid medium, but may as well be performed in a diluent-free process. Hydrocarbons and halogenated hydrocarbons are particularly suitable as solvents or diluents, the choice being wider than during the reduction process at low temperature. The hydrocarbons may be aliphatic, cycloaliphatic or aromatic compounds, or may be of a mixed aliphatic and aromatic character. In a "diluent-free" process, no diluent other than the ethylenically unsaturated hydrocarbon is used. Said hydrocarbon, however, may be a commercially produced material containing a small amount of inert materials. Thus propylene containing up to 5% w of inert materials — mainly propane — may be used. In propylene homopolymerization, feed thus employed preferably contains more than 98% w propylene.

As a rule, suitable concentrations of titanium compounds during the polymerization are between 0.1 and 20 milliatoms of Ti per liter (1 milliatom of Ti = 48 mg). Higher and lower concentrations are possible, howeve .

Temperatures during the polymerization are as a rule between +20° and +150° C, and preferably between 50° and 90° C. The pressure can also be an important factor in the polymerization of gaseous olefins. This pressure is usually between 1 and 70 bar abs., and is seldom below 1 bar abs.

In a "diluent-free" process the pressure and temperature may be such as to provide either a gaseous or a liquid polymerization medium. In the case of a gaseous medium the polymer — e.g., polypropene — and catalyst particles may be kept in a state of fluidization by maintaining a suitable linear velocity of the gaseous monomer through the polymerization vessel. In the case of a liquid polymerization medium the temperature and pressure should be subcritical, e.g., about 25 bar at 60° C or 35 bar at 70° C for propylene.

In order to ensure sufficient fluidity of the polymerization mixture, the solids content in the polymerization zone is suitable controlled so as not to exceed 60% w, a solids content of 25 to 55% w being preferred, dependent on the diluent used.

If desired, the polymerization can be carried out in the presence of substances, for example hydrogen, which reduce the molecular weight of the polymer. It has been found that in the presence of hydrogen the activity of the catalyst increases. Preferably 0.1–1% volume of $H_2$ is present in the gas cap of the reactor when polymerizing propylene according to the invention.

Other known means of modifying the polymerization reaction may be employed, as, for example, use of very small amounts of certain amines or of water to modify catalyst properties.

It has further been found that a substantial improvement in the activity of the $TiCl_3$ catalyst, without affecting other properties, can be obtained if any aluminum-(alkyl)polyhalide present in the catalyst, primarily ethylaluminum dichloride, is removed or converted. Such removal or conversion of polyhalide can be effected in various ways, as by careful washing with diluents, in particular hydrocarbon diluents. The polyhalide is preferably rendered harmless by conversion into monohalide or a complex. To the extent that it is desired to complex the polyhalide, preference is given to complexing with a Lewis base. Very good results are obtained with an ether as a Lewis base, in particular with dibutyl ether. The complexing is preferably performed at the end of the catalyst preparation, i.e., when the temperature of the $TiCl_3$-containing mixture has been raised to or above ambient temperature, in particular to a value between 100° and 175° C at which the $TiCl_3$ is changed into the gamma modification. Washing with diluent may suitably be carried out before the gamma conversion.

A highly efficient method is the combination of washing and complexing after the gamma conversion, i.e., by washing the final $TiCl_3$ catalyst composition with a solution of an ether in a hydrocarbon solvent, e.g., at room temperature. The solution may contain 0.1–10 %w of ether. A suitable diluent is the polymerization solvent. If the complexing agent is used as a solution in a solvent for washing the catalyst, the concentration of the complexing agent in the solution is preferably 1–5%w. If the washing operation is repeated, the concentration may be lower. It is further desirable to effect the washing/complexing in such a way that in the resultant $TiCl_3$ catalyst the Al/Ti molar ratio is between 0.10 and 0.35.

It is also possible to add a Lewis base as complexing agent during the polymerization. In general, it is desirable in this case to employ 5–25%w of complexing agent based on $TiCl_3$.

Polymer may be receovered from the reaction mixture, freed of contained catalyst components, and recovered in known manner. This invention is particularly suited to methods of polymer recovery in which there is no intervening liquid-solid separator but the total polymer is recovered after catalyst deactivation and removed by an evaporative method, as described, for example, in U.S. Pat. No. 3,040,005 to Cheney.

Polypropylene homopolymer made with the preferred $TiCl_3$-containing compositions of this invention is produced as a powder having 0–2 percent fines of less than 53 micron diameter, a freely settled bulk density of at least about 0.35 and generally at least about 0.38 g/ml, and a very low content of components extractable in boiling heptane, isooctane, or dibutylether.

The invention is illustrated by the following examples.

EXAMPLE

A. Preparation of non-porous $TiCl_3$-containing catalyst components

In a number of experiments the reduction of TiCl$_4$ was carried out under a nitrogen blanket and with stirring in a 700 ml reactor having a diameter of about 9 cm and no baffles. The reactor was assembled hot and sealed air-tight to ensure that no oxygen or water vapor could come into contact with the reaction mixture, and was provided with a six-blade turbine stirrer, a thermowell and an inlet tube which was connected with a burette. The largest diameter of the stirrer was 5 cm; the distance from the lower side of the stirrer to the bottom of the reactor equalled approximately one fourth of the height of the reaction vessel; the volume swept by the stirrer during stirring amounted to approximately 5% of the internal reactor volume. The reactor was charged with a solution of 19.8 ml AlEt$_3$ (140 mmol) in 155.2 ml of the liquid alkane diluent mentioned in Table I (AlEt$_3$ concentration 0.8 mol per liter), while stirring was started, and subsequently brought to the desired mixing temperature given in Table I by cooling with a mixture of liquid n-pentane and liquid nitrogen. From the burette a solution of TiCl$_4$ in the same diluent was gradually added to the AlEt$_3$ solution at an approximately uniform rate over a period of 3 hours. The stirring speed, the amount of TiCl$_4$ added and the concentration of the TiCl$_4$ solution are also given in Table I. Then the temperature of the resulting slurry was raised to ambient temperature in 3 hours, the stirring rate being kept unchanged. Subsequently the slurry was transferred to an autoclave in which it was heated (again in a nitrogen atmosphere, while stirring) to 155°–160° C in 2 hours, and maintained at this temperature for another hour. Finally the mixture was cooled to ambient temperature in 1 ½ hours and the particle size of the resulting TiCl$_3$-containing catalyst component examined microscopically. The particle size distribution proved to be very narrow; the average particle size is given in Table I, which includes further data and results.

Experiments 1–3 were carried out according to the present invention; experiments 4–6 were performed for comparison.

B. Preparation of homopolymers of propylene

The catalyst components obtained in experiments 1–6 were tested in homopolymerizations of propylene at 70° C in the presence of a small amount of hydrogen. In each polymerization experiment a slurry of the TiCl$_3$-containing catalyst component in 1.5 liters of 2,2,4-trimethylpentane was used, the slurry containing 4.5 millimoles of TiCl$_3$. The polymerizations were carried out in a reactor having a capacity of 3 liters, provided with a turbine stirrer rotating with a speed of 1,500 rev/minute. After the diluent had been heated to a temperature of 70° C, 9 millimoles AlEt$_2$Cl was added first and then the TiCl$_3$-containing slurry, whereupon the polymerization was started by replacing the nitrogen atmosphere (which was present initially) by propylene. The propylene pressure, which was kept constant during the polymerization by means of a contact manometer, is given in Table II. A small stream of hydrogen was also introduced into the reactor, in such a way as to maintain a hydrogen concentration in the gas cap of 0.75%v, thus controlling the molecular weight of the polymer to the desired value. In order to prevent the buildup of inert gases in the gas cap, part of the gas present was continuously released and its composition repeatedly checked by gas chromatography.

The polymerization was continued for 4 hours; pressure was then released and polymerization terminated by introducing nitrogen and by adding secondary butanol and hydrochloric acid to the reaction mixture. This mixture was then kept at 80° C for some time, whereupon the resulting polymer suspension was washed with a 1%w solution of HCl in water and three times with water. After admixture of 0.05%w (based on polymer) of 1,3,5-trimethyl-2,4,6-tris(3,5-ditertbutyl-4-hydroxybenzyl) benzene as antioxidant, the suspension was subjected to steam distillation to a maximum temperature of 100° C in the presence of a small amount of Na$_2$CO$_3$ (added as a 10%w aqueous solution, resulting in pH of approximately 9), filtered off and dried under nitrogen for 8 hours at 50°–60° C. The isooctane solubles content at 70° C of the polymers produced was about 2%w.

The polymerization results are summarized in Table II.

TABLE II

| TiCl$_3$-containing catalyst component from Exp. No. (see Table I) | This Invention | | | | Comparative Experiments | | |
|---|---|---|---|---|---|---|---|
| | 1 | 1 | 2 | 3 | 4 | 5 | 6 |
| Cat. Prep. Diluent | n-C$_5$ | n-C$_5$ | n-C$_5$ | n-C$_5$ | i-C$_8$ | n-C$_5$ | i-C$_8$ |
| Mixing temperature, °C | −100 | −100 | −100 | −120 | −100 | −70 | −70 |
| Polymerization Data | | | | | | | |
| Propylene pressure, bar abs. (bar C$_3$=) | 2 | 5 | 2 | 2 | 2 | 2 | 2 |
| Cat. Activity, $\frac{\text{g polymer}}{\text{g TiCl}_3.\text{h.barC}_3=}$ | 50 | 50 | 45 | 40 | 30 | 50 | 50 |
| Properties of the polypropylene | | | | | | | |
| freely settled bulk density, g/ml | 0.40 | 0.39 | 0.46 | 0.30 | 0.27 | 0.35 | 0.41 |
| powder flow (ASTM D 1895 method A) s/100 ml | 8 | 7 | 12 | 9 | 14 | 13 | no flow |
| particle size distribution, sieve fraction < 53 μ,% | < 2* | 0 | 2* | 5* | 99** | 15+ | 60++ |
| > 88 μ,% | >90* | >98* | 5* | 80* | 0 | 30+ | 6++ |
| LVN 135°C decalin, dl/g | 2.2 | 2.5 | 2.3 | 2.5 | 2.0 | 2.0 | 2.4 |
| melt index (ASTM D1238 condition E) g/10 min. | 5.2 | 4.5 | 3.9 | 4.0 | 8.6 | 8.6 | 4.0 |
| yield stress, MN/m$^2$ | 38.5 | 38.5 | 39.0 | 37.5 | 36.0 | 39.0 | 37.5 |

\* smooth spherical particles
\*\* irregular particles with rough surface
+agglomerated particles with rough surface
++sharp-edged particles

C. Preparation of a high-impact polypropylene

In the polymerization reactor described under B, a homopolymerization of propylene was started in which the TiCl$_3$-containing catalyst component obtained in experiment 1 was used. The conditions were as described under B, the only difference being that the TiCl$_3$ slurry contained 3 mmol of TiCl$_3$ and that the propylene pressure was 5 bar abs. The homopolymerization was continued for 2 hours, the reaction mixture then being cooled down to 60° C. Subsequently the propylene was replaced by a mixture of ethylene and propylene (molar ratio 50/50) at atmospheric pressure. After 3.5. hours the polymerization was terminated and the resulting "toughened" polypropylene was isolated and dried as described under B. A polymer powder was obtained having the following properties.

| | |
|---|---|
| Materials extractable with isooctane at 80°C | 6%w |
| Ethylene content on total polymer | 6.7%w |
| Copolymer content of total polymer | 10.1%w |
| Ethylene content of copolymer | 66%w |
| LVN (135°C in decalin) | 2.6 dl/g |
| freely settled bulk density | 0.37 g/ml |
| powder flow (ASTM D1895 Method A) | 7 s/100 ml |
| yield stress | 29.5 MN/m$^2$ |
| Izod impact at 0°C | 4.9 kJ/m$^2$ |
| Izod impact at 20°C | 10.2 kJ/m$^2$ |
| particle size | diameter of all particles more than 100μ |

D. Preparation of a porous-surfaced catalyst and influence of hydrogen on polymerization A porous-surfaced catalyst was prepared at −100° C in n-pentane employing an Al/Ti ratio of 0.35 by following the procedure described, under A, modified as follows. The first 5% of TiCl$_4$ was added quickly, the rest gradually over a period of 2.5 hours at −100° C. The stirrer speed was 250 rpm. The TiCl$_3$ obtained was heated in 2 hours to room temperature, then kept for 1 hour at 160° C.

As described sub B, polymerizations of propylene were effected with this catalyst in the presence and absence of hydrogen. Results appear from the following table:

| | | |
|---|---|---|
| H$_2$ present in gas cap, %v | 0.1 | 0.6 |
| LVN of polypropylene, dl/g | 3.9 | 2.4 |
| Catalyst activity, g/g/bar/h | 39 | 57 |

E. Influence of TiCl$_3$ catalyst particle surface porosity on polymer powder properties Substantially as described sub A, a dense, smooth-surfaced catalyst was prepared at −100° C in n-pentane at an Al/Ti ratio of 0.35 and a stirrer speed of 250 rpm. One third of the TiCl$_4$ was added gradually over a period of 2 hours, the remaining part in 40 minutes, at 100° C. The composition was brought to room temperature in 1.1 hours, then heated at 160° C for 1 hour. The catalyst particle size was 15 - 118 μm. Substantially as described sub C, sequential homo- and copolymerizations were carried out with the TiCl$_3$ catalyst components obtained according to the methods described under D and E, respectively. The high-impact polypropylenes obtained possessed the following properties:

| TiCl$_3$ used | D (porous-surfaced) | E (dense, smooth-surfaced.) |
|---|---|---|
| extractables, %w | 5 | 5 |
| ethylene content on total polymer, %w | 6.5 | 6.9 |
| ethylene content of copolymer, %w | 57 | 61.5 |
| copolymer content of total polymer, %w | 11.3 | 11.2 |
| melt index, g/10 min | 1.8 | 1.7 |
| bulk density, g/ml | 0.36 | 0.29 |
| flow, sec. | 7.0 | 8.0 |
| yield stress, MN/m$^2$ | 27.5 | 26.5 |
| particle size | >100μ | >100μ |
| compacting tendency | not sticky, no tendency to agglomerate, non-compacting | strongly agglomerated, sticky, compacting tendency |

F. Influence of specific stirring power

Substantially as described sub E, TiCl$_3$ catalyst components were prepared employing various stirrer speeds, the higher speeds involving greater power inputs. The average particle size of the TiCl$_3$ obtained was as follows:

| Stirrer speed, rpm | TiCl$_3$ average particle size, μ |
|---|---|
| 250 | 15 |
| 300 | 12 |
| 400 | 9 |
| 500 | 7 |

G. Influence of ether washing

A TiCl$_3$ composition prepared according to Example D was — after the heat treatment — washed at room temperature with n-heptane containing 2%w dibutylether. Polymerizations were carried out with treated and untreated catalyst according to the method of Example D with the following results:

| Catalyst, treated with ether | no | yes |
|---|---|---|
| H$_2$ in gas cap, %v | 0.6 | 0.6 |
| Catalyst activity, g/g/bar/h | 57 | 75 |
| Al/Ti ratio in TiCl$_3$ (analysis) | 0.33 | 0.15 |
| Polymer, LVN, dl/g | 2.4 | 2.4 |
| Yield stress, MN/m$^2$ | 37 | 34 |

H. Influence of temperature.

Substantially as described sub A, TiCl$_3$ was prepared in n-pentane, employing various temperatures, an Al/Ti ratio of 0.44 and a stirrer speed of 250 rpm. Propylene polymerization was carried out as described sub B. Results appear from the following table:

| TiCl$_3$ preparation: | | | |
|---|---|---|---|
| Temperature, °C | −80 | −90 | −100 |
| Specific stirring power, W/m$^3$(a) | 84 | 88 | 93 |
| Heating rate, °C/min | 0.09 | 0.12 | 0.10 |
| Particle size, μ | 10-30 | 10-27 | 10-27 |
| Polymerization | | | |
| Catalyst activity g/g/bar/h | 52 | 54 | 51 |
| Extractable in boiling ether, %w | 2.0 | 1.8 | 1.9 |
| Bulk density, g/ml | 0.27 | 0.32 | 0.35 |

(a) At constant stirring speed, power input increased with increasing viscosity of the reaction mixture.

It is shown that with TiCl$_3$ obtained at progressively lower initial mixing temperatures, polypropylene having progressively greater bulk density may be obtained.

We claim as our invention:

1. The method of producing a titanium trichloride composition consisting of dense, smooth-surfaced particles adapted for use as catalyst component in the stereoregular polymerization of propylene to a polymer powder containing no more than 2% of fines of less than 53 micron diameter and having a freely settled bulk density of at least about 0.32 g/ml which consists essentially of:

1. gradually, over a period of at least one hour, adding a solution of titanium tetrachloride in alkane diluent to an agitated solution of aluminum trialkyl in alkane diluent at a mole ratio of titanium tetrachloride to aluminum trialkyl in the range from 3:0.9 to 3:1.5, at a mixing temperature T within the range from below $-90°$ to $-125°$ C, wherein the freezing point of said diluent is below $(T - 15)°$ C, the first 10 percent of said titanium tetrachloride being added gradually at substantially uniform rate over a period of at least 25 minutes;
   2. after completion of said addition gradually raising the temperature of the mixture to at least about $-30°$ C at a rate less than $1°$ C per minute and maintaining it below $80°$ C until the reduction of TiCl$_4$ to TiCl$_3$ is substantially complete;
   3. converting said TiCl$_3$ to the violet form by raising the temperature of the TiCl$_3$-containing component slurried in alkane diluent, to a temperature in the range between $100°$ and $250°$ C; and
   4. cooling the resulting slurry to at least below $80°$ C.

2. The method according to claim 1 wherein said aluminum trialkyl is aluminum triethyl, said diluent is n-butane, n-pentane or isopentane, or mixtures thereof, said ratio is in the range from 3:1.05 to 3:1.3 and said mixing temperature T is in the range from below $-90°$ to $-110°$ C.

3. The method of producing a titanium trichloride composition consisting of dense particles having a porous surface, adapted for use as catalyst component in the staged, stereoregular polymerization of propylene and propylene-ethylene mixture to produce impact-improved copolymer which consists essentially of:

1. adding a solution of titanium tetrachloride in alkane diluent over a period of at least one hour to an agitated solution of aluminum trialkyl in alkane diluent at a mole ratio of titanium tetrachloride to aluminum trialkyl in the range from 3:0.9 to 3:1.5 at a mixing temperature T within the range from below $-90°$ to $-125°$ C, wherein the freezing point of said diluent is below $(T - 15)°$ C, the first 5 to about 10 percent of said titanium tetrachloride being added rapidly over a period of no more than 5 minutes and the remainder gradually;
   2. after completion of said addition gradually raising the temperature of the mixture to at least about $-30°$ C at a rate in the range from $2°$ to $5°$ C per minute and maintaining it below $80°$ C until the reduction of TiCl$_4$ to TiCl$_3$ therein is substantially complete;
   3. converting said TiCl$_3$ to the violet form by raising the temperature of the resulting TiCl$_3$-containing component, slurried in alkane diluent, to a temperature in the range between $100°$ and $250°$ C and
   4. cooling the resulting slurry to at least below $80°$ C.

4. The method according to claim 3 wherein said aluminum trialkyl is aluminum triethyl, said diluent is n-butane, n-pentane or isopentane, or mixtures thereof, said ratio is in the range from 3:1.05 to 3:1.3 and said mixing temperature T is in the range from below $-90°$ to $-110°$ C.

* * * * *